Oct. 11, 1966 R. L. BARKES 3,278,863

MICROWAVE VARIABLE TUNED OSCILLATOR

Filed Dec. 6, 1963 4 Sheets-Sheet 1

INVENTOR.
Ralph L. Barkes

BY

Blair & Buckles
ATTORNEYS.

Oct. 11, 1966 R. L. BARKES 3,278,863

MICROWAVE VARIABLE TUNED OSCILLATOR

Filed Dec. 6, 1963 4 Sheets-Sheet 2

INVENTOR.
Ralph L. Barkes
BY

Blair & Buckles
ATTORNEYS.

MICROWAVE VARIABLE TUNED OSCILLATOR

Filed Dec. 6, 1963

INVENTOR.

Ralph L. Barkes

BY

Blair & Buckles
ATTORNEYS.

MICROWAVE VARIABLE TUNED OSCILLATOR

Filed Dec. 6, 1963 4 Sheets-Sheet 4

INVENTOR.
Ralph L. Barkes
BY

Blair & Buckles
ATTORNEYS.

United States Patent Office 3,278,863
Patented Oct. 11, 1966

3,278,863

MICROWAVE VARIABLE TUNED OSCILLATOR

Ralph L. Barkes, Tampa, Fla., assignor to Trak Microwave Corporation, Tampa, Fla.

Filed Dec. 6, 1963, Ser. No. 328,613
7 Claims. (Cl. 332—30)

The present invention relates to radio frequency devices having distributed parameter circuits. More specifically, it relates to a variable frequency microwave source and particularly, a vacuum triode oscillator of extremely light weight and small physical size.

The emphasis on miniaturization occasioned by the severe space and weight requirements which must be satisfied in the design of airborne equipment, as for example, communication systems, has presented a considerable challenge to industry. The electronics industry, in particular, has responded to this challenge by developing miniaturized circuit elements as well as miniaturized system components.

In addition to meeting space and weight requirements, airborne equipment and its component parts must be of particularly rugged design to withstand extreme vibrational shocks and inertial forces without damage.

In applicant's co-pending application, Serial No. 323,931, filed November 15, 1963, and entitled "Electronically Tuned Oscillator," there is disclosed and claimed a frequency tunable microwave source employing an electronically variable reactance element wholly disposed in the plate resonant cavity. The variable reactance, under control of an external biasing or modulating source, functions to vary a parameter of the plate resonant cavity and, by the same token, its resonant frequency.

I have also found that it is practical to achieve a frequency modulated microwave source by varying the phase of the electromagnetic energy fed back from the plate resonant cavity to the cathode resonant cavity for application to the input of the oscillating active elements such as a vacuum tube triode.

It is therefore an object of the present invention to provide a microwave source of extremely small size and rugged, lightweight construction.

A further object is to provide a microwave source of simplified design in that it is easily fabricated and readily assembled.

An additional object is to provide a frequency tunable microwave source employing electronically variable feedback circuit means.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Figure 1:
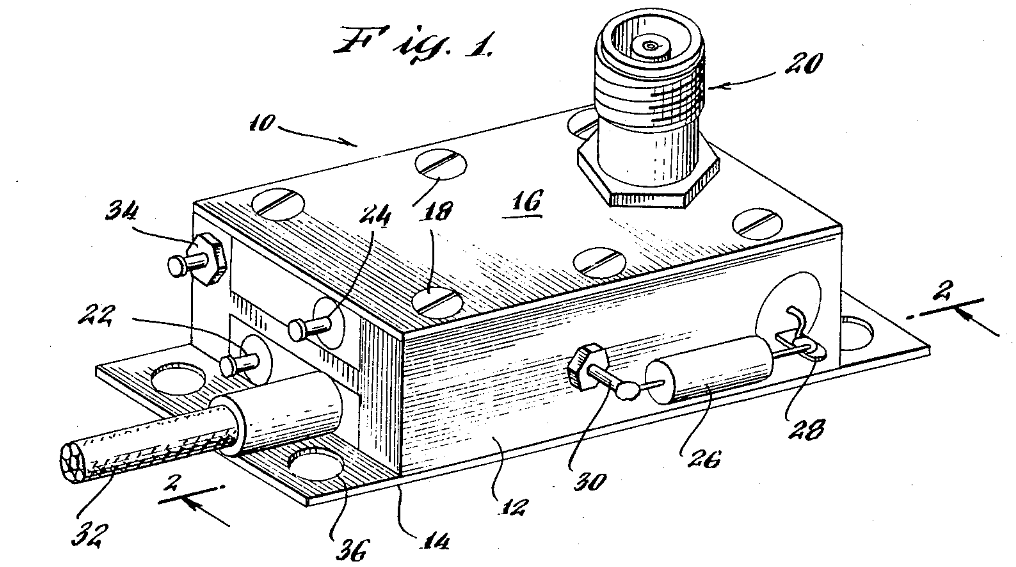
FIGURE 1 is a perspective view of a mircowave source embodying the invention.

In general and as seen in FIGURE 1, a source embodying my invention and generally indicated at 10 has an electrically conductive housing 12, a bottom plate 14, and a cover plate 16. The bottom plate 14 and the cover plate 16 are secured to the housing 12 by a plurality of screws 18 as shown securing the cover plate to the housing. The cover plate 16 is fitted with a coaxial output connector generally indicated at 20 for extracting the desired radio frequency output signal from the source 10 for application to an output load, not shown. As an example of the miniature size of source 10, in one physical embodiment of my invention, the housing 12 is two inches long, one inch wide and seven-eighth of an inch in height.

As further seen in FIGURE 1, terminal posts 22 and 24 provide for external circuit connection to a filament voltage supply (not shown) and a plate or B+ supply (not shown), respectively. These supply sources provide the necessary D.C. energization for operation of the source 10. A grid leak resistor 26 is connected between an external grid terminal 28 and a ground terminal post 30, mounted in electrically conductive engagement with the housing 12.

A cable 32 supplies a D.C. biasing voltage for electronically tuning the source 10. A ground terminal post 34 in conductive engagement with the housing 12, is provided for external ground circuit connection. The bottom plate 14 is provided with a plurality of holes 36 to facilitate mounting of the source 10 to a chassis (not shown).

Figure 3:
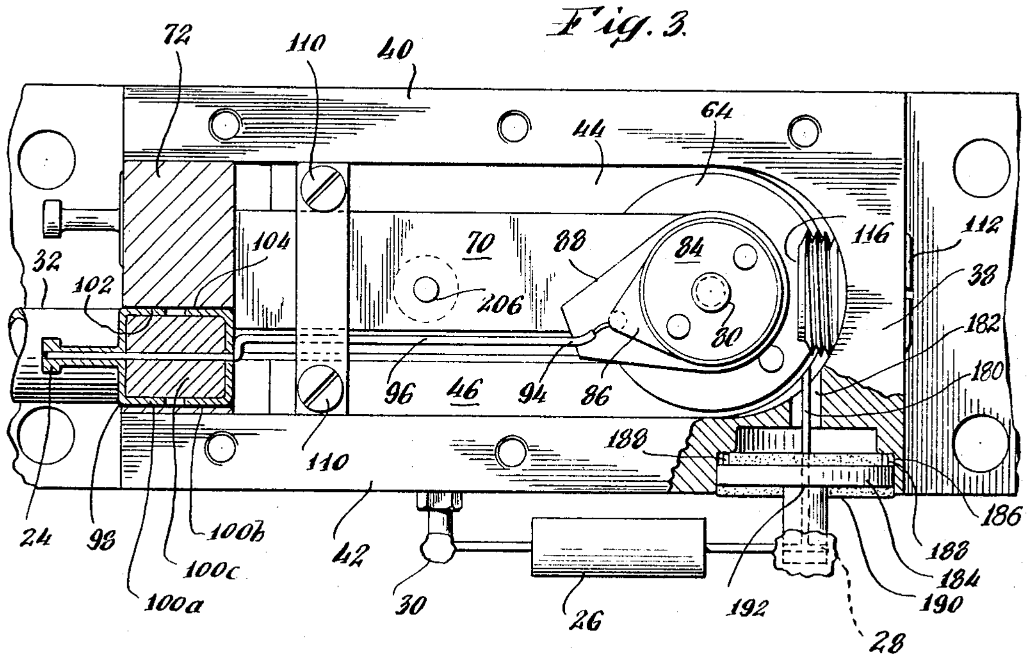
FIGURE 3 is a top plan view, partly broken away, of the source of FIGURE 1 and FIGURE 2 with the cover plate removed to show the interior thereof.

The housing 12, as more clearly seen in the remaining figures of the drawings, is preferably formed as an integral aluminum casting having an end wall 38 and a pair of side walls 40 and 42 (FIGURE 3). A partition 44, integral with the side walls 40, 42, and end wall 38, divides the housing into two substantially equal resonant cavities, a plate cavity 46 and a cathode cavity 48. This physical arrangement of the two cavities 46 and 48, one over the other, is a major factor in reducing the physical size of the source 10. The end wall 38 has a semicircular internal surface configuration and thus blends into the interior surface of side walls 40 and 42 to ensure a uniform voltage distribution in the cavities 46 and 48 in the vicinity of the end wall.

Figure 5:
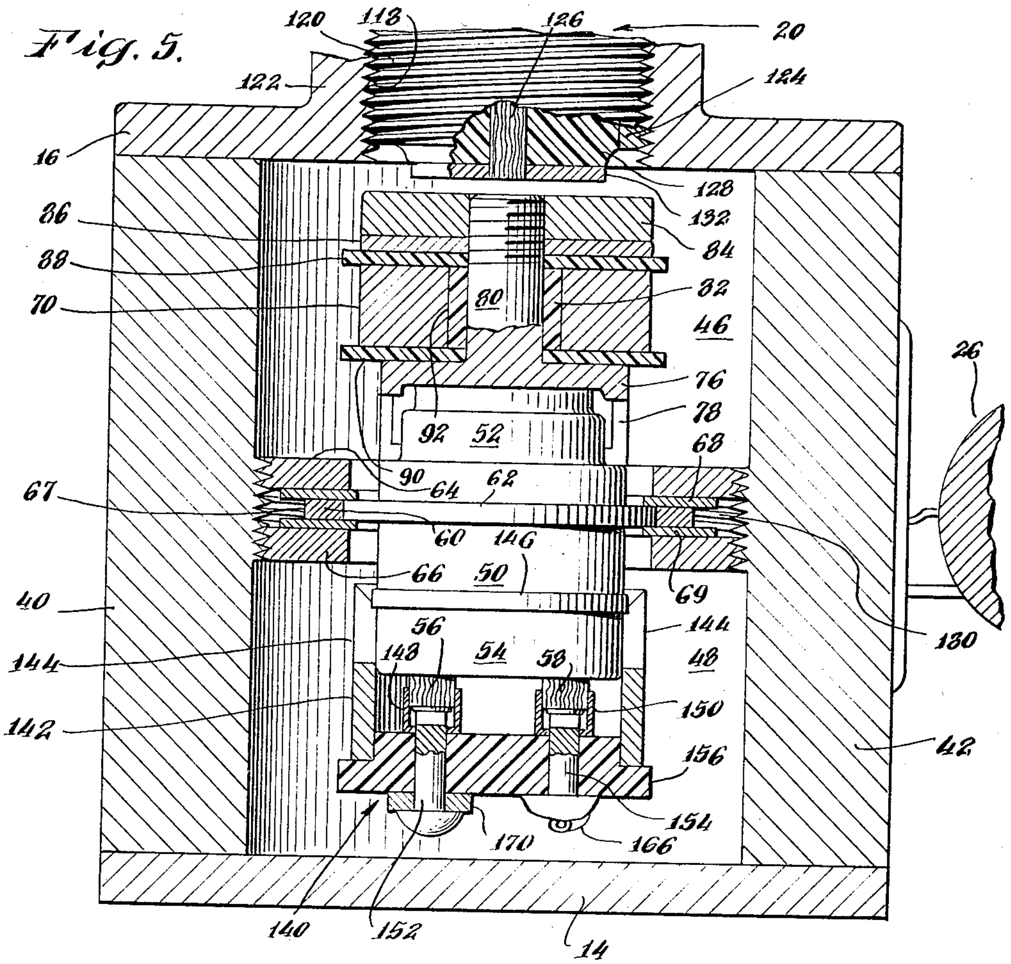
FIGURE 5 is an enlarged sectional end elevation view taken along line 5—5 of FIGURE 2.

As most clearly seen in FIGURE 5, a triode 50, capable of high frequency operation, is rigidly mounted in the partition 44 near end wall 38 such that its anode terminal 52 is disposed in the plate cavity 46 and its cathode terminal 54, including filament terminals 56 and 58, is disposed in the cathode cavity 48. In order to fixedly mount the triode 50, a grid contacting ring 60, affixed to the grid terminal ring 62 of the triode by suitable means, is clamped between grid nuts 64 and 66 which are threaded into an aperture 67 in the partition 44 adjacent the end wall 38 of the housing 12. The grid terminal ring 62 of triode 50 and the grid contacting ring 60 are insulated from the partition 44 and thus housing 12 by insulating washers 68 and 69 disposed between the grid contacting ring 60 and the grid nuts 64 and 66 (FIGURE 5).

Returning to FIGURE 2, an anode line 70 is supported at its one end 70_a_ in an anode line support member 72 disposed in the open end of cavity 46. Support member 72 is affixed to the housing 12 preferably by a dip brazing process while end 70*a* of the anode line 70 is likewise retained in a slot 72*a* in the support member. The free end 70*b* of the anode line 70 supports an anode contact assembly 74 electrically contacting the anode terminal 52 of triode 50.

The anode contact assembly 74, as more clearly seen in FIGURE 5, includes a cup-shaped anode contact 76 integrally formed with circumferentially spaced resilient fingers 78 for gripping the anode terminal 52 and a stud 80 which extends through a hole 82 provided in anode line 70. A nut 84 threadedly engages stud 80 to clamp a connector 86 to the anode contact assembly 74 and the contact assembly to the anode line 70. The B+ D.C. supply circuit through the assembly 74 from connector 86 through nut 84, stud 80, contact 76 and fingers 78 to anode terminal 52 of triode 50 is insulated from the anode line 70 by a pair of insulating washers 88 and 90 and an insulating sleeve 92. Moreover, the anode line 70 is capacitively coupled to the anode terminal 52 at radio frequencies as indicated in FIGURE 8 by the capacitor 52*a*.

Connection between the external B+ terminal post 24 and the connector 86, as seen in FIGURE 3, is effected by an anode lead 94 which lies in a longitudinal groove 96 formed in the upper surface of anode line 70. The groove 96 is filled with an epoxy resin to retain lead 94 therein. Incorporated with the terminal 24 and the lead 94 is a radio frequency choke, generally indicated at 98, for preventing radio frequency energy from leaking from the plate cavity 46 on lead 94 to the external B+ supply circuit. The choke 98 comprises a cup-shaped front terminal 100*a* and a cup-shaped rear terminal 100*b* spaced apart by an intervening ferrite rod 100*c*. The radio frequency choke 98 is inserted in a hole 102 provided in anode line support 72 and is insulated therefrom by a wrapping 104 of insulation such as Mylar tape to provide shunt bypass capacity at radio frequencies. The anode lead 94 is threaded through a central bore in the rear filter terminal 100*b*, the ferrite rod 100*c* and the front filter terminal 100*a* and electrically connected such as by solder to the anode external terminal 24 integrally formed with the front choke terminal 100*a* to complete the low impedance D.C. path to the anode contact assembly 74 where the end of lead 94 is soldered to connector 86. The ferrite rod 100*c* functions as an inductance element which, at radio frequencies, is a high impedance and in combination with the bypass capacity between the filter terminals 100*a* and 100*b* and the anode line support 72 forms a filter network for effectively preventing leakage of RF energy from the plate cavity 46 on lead 94. This RF choke 98 is also seen in FIGURE 8.

Figure 2:
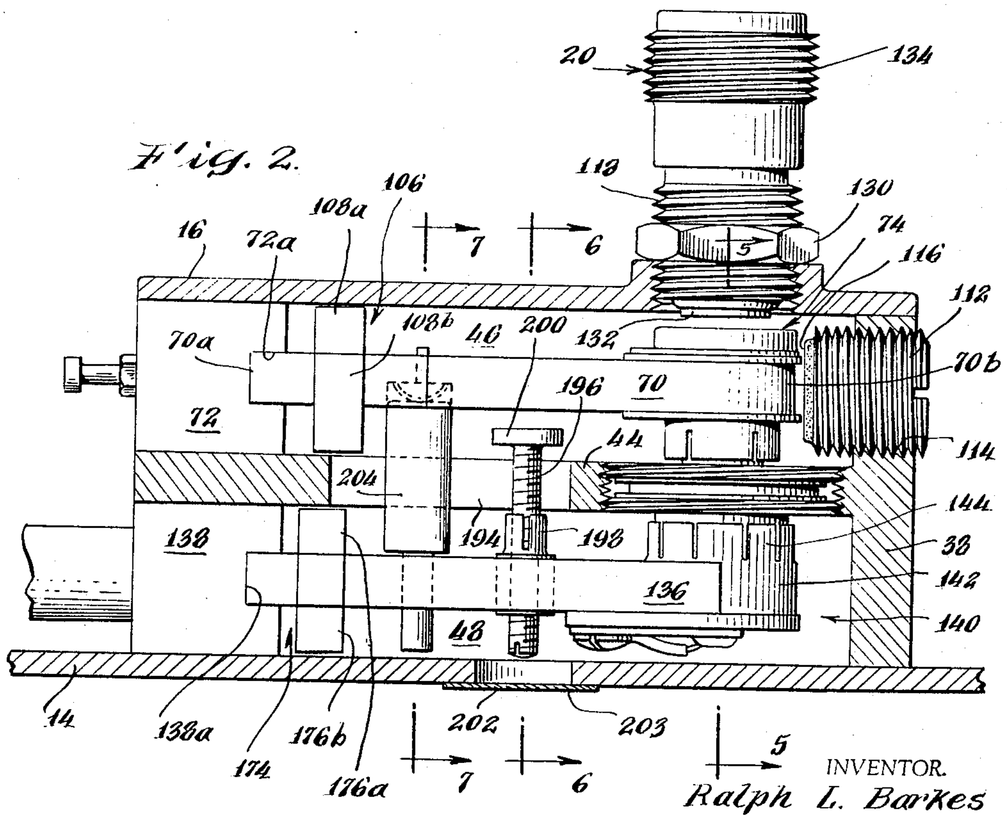
FIGURE 2 is an enlarged sectional side elevation view of the source of FIGURE 1 taken along line 2—2 of FIGURE 1.

As seen in FIGURES 2 and 3, a shorting block indicated generally at 106, is formed in two parts; an upper member 108*a* and a U-shaped lower member 108*b* joined together by screws 110. The shorting block 106 is adapted to embrace the anode line 70 and thus define the lefthand boundary of plate cavity 46. Loosening of the screws 110 allows the shorting block 106 to be adjustably positioned along the anode line 70 and thus vary the dimensions of the anode cavity 46. The shorting block 106 thereby provides for coarse frequency tuning of the anode cavity 46 and is employed in the present invention to establish the center operating frequency of the source 10. The shorting block 106 is shown diagrammatically in FIGURE 8.

Figure 8:
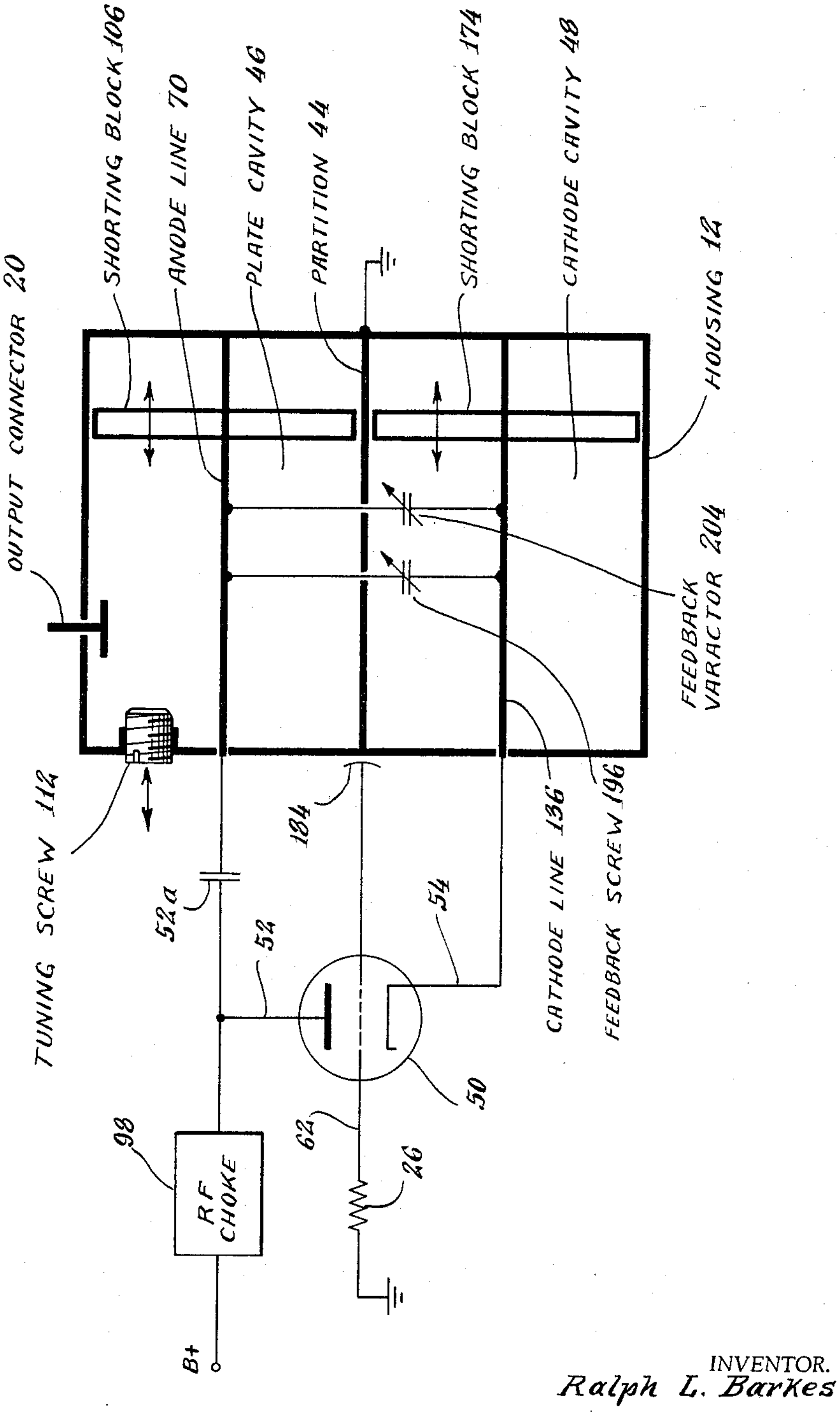
FIGURE 8 is a simplified diagrammatic representation of the microwave source of FIGURE 1.

To provide for further frequency tuning of plate cavity 46, a tuning screw 112, seen in FIGURES 2, 3, and diagrammatically in FIGURE 8 is advanced to the desired degree of penetration into cavity 46 through a threaded hole 114 provided in end wall 38 of the housing 12. The inner end of the tuning screw 112 is coated with insulation 116 to prevent direct electrical contact between the tuning screw and the anode line 70 when the former is advanced to the maximum degree of penetration. The tuning screw 112 may advantageously be used to vary the center operating frequency of source 10 over a limited frequency range by introducing a lumped capacity into the plate cavity to vary its resonant frequency.

Returning to FIGURES 2 and 5, the coaxial output connector 20 has a lower threaded portion 118 engaging a threaded bore 120 provided in a collar 122 and the cover plate 16. The output connector 20 includes an outer coaxial conductor 124 in electrical contact with the housing 12 along bore 120 and a coaxial inner conductor 126 spaced apart by an intervening dielectric medium 128 as particularly seen in FIGURE 5. A locknut 130 engaging threaded portion 118 provides for adjustment of the degree of penetration of the lower end of the inner conductor 126 into the plate cavity 46. By adjusting the degree of penetration of the lower end of the inner conductor 126, the amount of radio frequency energy extracted from cavity 46 may be varied correspondingly. The lower end of inner conductor 126 supports a conductive disk 132 to enhance the capacitive coupling between the connector 20 and the cavity 46. The upper end of the output connector 20 is provided with a threaded portion 134 to facilitate attachment of an output coaxial line. The output connector 20 is shown diagrammatically in FIGURE 8.

Figure 4:
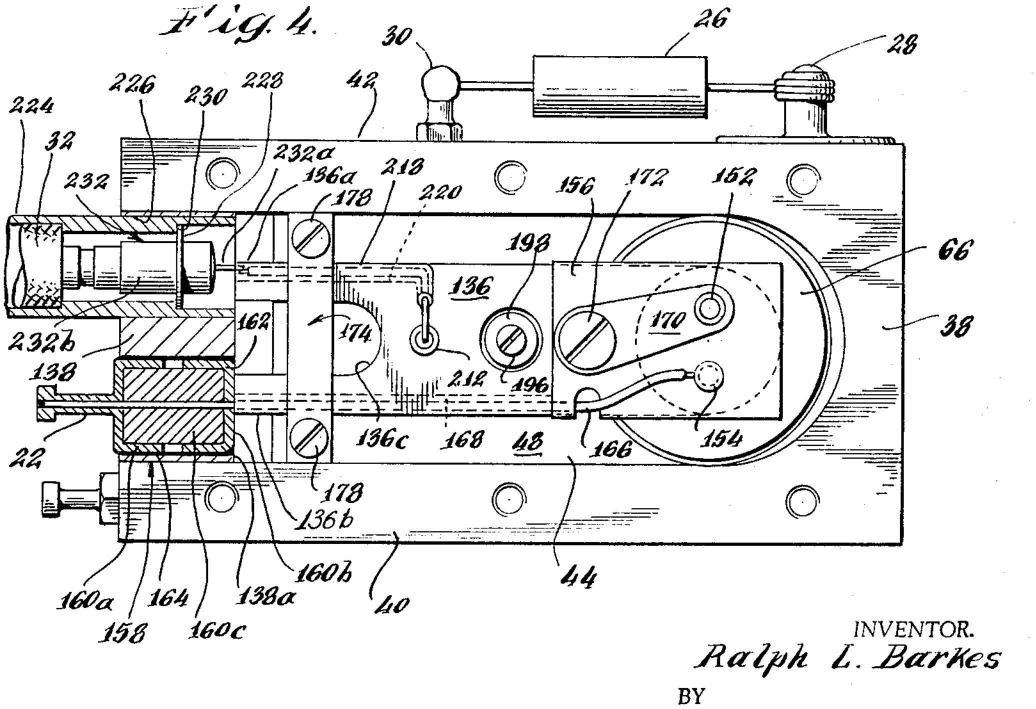
FIGURE 4 is a bottom plan view, partly broken away, of the source of FIGURES 1, 2 and 3 with the bottom plate removed to show the interior thereof.

Turning now to a detailed consideration of the cathode cavity 48, as seen in FIGURES 2, 4, 5, and diagrammatically in FIGURE 8, a cathode line 136 is mounted in a cathode line supporting member 138. The cathode line 136 is formed having bifurcated end portions 136*a* and 136*b* which are retained in a slot 138*a* in support 138 by dip brazing, for example. The recess 136*c* between the bifurcated ends 136*a* and 136*b* of the cathode line 136 is dimensioned to create the proper characteristic impedance for the cathode cavity 48 in relation to the characteristic impedance of the plate cavity 46. Moreover, the provision of the recess 136*c* allows the physical length of the cathode line 136 to approximate that of the anode line 70, thus contributing to the compact size of source 10. Support 138 is received in the open end of cathode cavity 48 and secured therein by any suitable means, such as dip brazing. The free end of the cathode line 136 supports a cathode contact assembly 140 for electrical connection between the cathode terminal 54 of the triode 50 and the cathode line which is tied to ground through housing 12. The cathode contact assembly 140 includes a cylindrically shaped contact 142 having circumferentially spaced resilient fingers 144 at one end thereof for engaging the cathode terminal 54 of the triode 50. To insure good electrical contact between the cathode terminal 54 and the contact 142, the cathode terminal is grooved to receive a split ring 146 such that as the contact 142 is telescoped over the cathode terminal 54, the resilient fingers 144 ride over the protruding surface of the split ring 146. The filament terminals 56 and 58 of tube 50 are engaged by filament contact members 148 and 150. These filament contact members are mounted in spaced relationship by integrally formed stems 152 and 154 which extend through a filament block 156. Filament block 156 is secured over the open end of contactor 142 and is formed of fiberglass material, thereby electrically insulating the filament contact members from each other and from the cathode line 136.

Turning to FIGURE 4, the filament terminal post 22, like the external anode terminal post 24, is incorporated with a radio frequency choke generally indicated at 158, whose function is identical to that of RF choke 98 (FIGURE 3). Accordingly, a front terminal 160*a* integrally formed with the external filament terminal 22 and a rear terminal 160*b* spaced apart by an intervening ferrite rod 160*c* are retained as a unit in a hole 162 provided in the cathode line support 138 and insulated therefrom by a wrapping 164 of Mylar tape. An insulation coated filament lead 166, recessed in a groove 168 extending along the lateral edge of the cathode line 136 threads through the central bore in the choke parts and is electrically connected by solder at one end to the stem 154 of filament contact 150 and, at its other end, to the terminal post 22. A conductive link 170 provides a ground connection for the other side of the filament circuit. Link 170 has one end soldered to the stem 152 of filament contact 148 and the other end electrically connected to the cathode line 136 via screw 172. The cathode line 136, in turn, is in electrical contact with the housing 12 and ground potential through support member 138.

As in the case of the anode line 70, a shorting block, indicated generally at 174, including an upper member **176*a* and a U-shaped lower member 176*b* embraces the cathode line 136 to terminate cathode cavity 48. Screws 178 provide releasing means for selective positioning of shorting block 174 to selectively vary the dimensions of cathode cavity 48** and, by the same token, its resonant frequency.

Considering the circuit for the grid of triode 50, as best seen in FIGURE 3, an insulation coated wire 180, extending through a hole 182 in side wall 42, electrically connects the grid ring 62 (FIGURE 5) to the terminal post 28 which, in turn, is connected through resistor 26 to ground terminal post 30. Wire 180 has one end soldered to grid contacting ring 60 which, in turn, engages grid ring 62 of triode 50. Terminal 28 also forms a plate connection for a capacitor 184 with the other plate connection being effected along an internal shoulder 186 in hole 182 by contactors 188. Capacitor 184 is retained in hole 182 by an epoxy resin 190. Capacitor 184 is thus connected between the grid circuit formed in part by wire 180 which extends through a central aperture 192 in capacitor 184 and the housing 12 to provide a low impedance shunt path for radio frequency signals. Thus the grid of triode 50, as seen in FIGURE 8, is effectively grounded for radio frequency signals but, at D.C., is biased above ground by resistor 26, to limit the plate current during operation of source 10.

Figure 6:
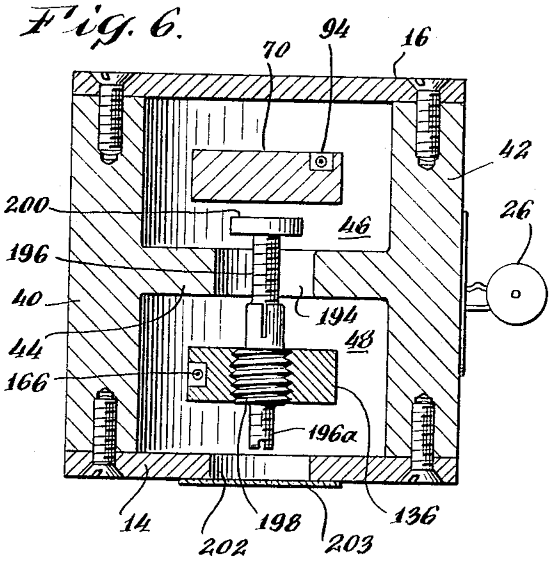
FIGURE 6 is a sectional end elevation view taken along line 6—6 of FIGURE 2.

In order to achieve oscillatory operation of the source 10, communication between the anode cavity 46 and the cathode cavity 48 is provided by an aperture 194 in partition 48 (FIGURES 2 and 6). A feedback screw 196 having a threaded portion engaged in a locknut 198 which in turn is threadedly mounted in the cathode line 136 extends through aperture 194. One end of feedback screw 196 is formed in the shape of a disk 200 to enhance the coupling of the radio frequency energy from the plate cavity 46 to the cathode cavity 48. The other end of the feedback screw 196 is provided with a slot **196*a* to facilitate rotation by a tool which may enter the cathode cavity 48 through a hole 202 in the bottom plate 14. Hole 202 is normally sealed by an adhesive tape 203 to prevent entry of dust or other foreign matter. Rotation of the feedback screw 196 varies the degree of penetration of the disk portion 200 of the feedback screw 196 into the anode cavity 46. Although manipulation of the feedback screw 196 to vary its penetration into the plate cavity 46 serves to vary the phase and amplitude of the feedback energy, it is contemplated by the invention that its penetration be initially adjusted for optimum performance of the source 10** at a pre-selected center operating frequency and that further variations in the amplitude and phase of the feedback energy be achieved in the manner to be described.

Figure 7:
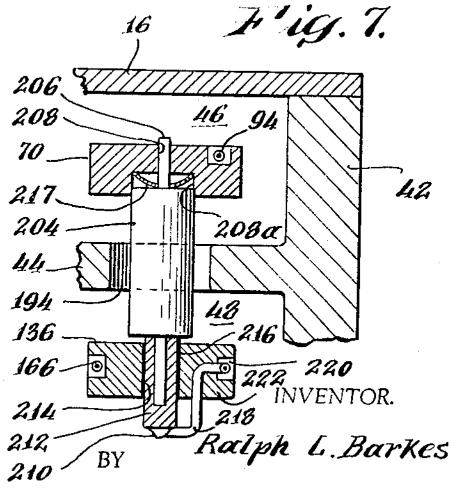
FIGURE 7 is a sectional end elevation view taken along line 7—7 of FIGURE 2.

Supplementing the energy feedback path provided by the feedback screw 196, a voltage variable capacitor 204, generally referred to in the art as a varactor diode, extends through the aperture 194 in the partition 44 and is mounted at its terminal ends between the anode line 70 and the cathode line 136 as seen in FIGURES 2 and 7. As detailed in FIGURE 7, the upper terminal pin 206 of the varactor 204 is inserted in a hole 208 for effecting direct electrical contact with the anode line 70. The lower terminal pin 210 is received in a terminal socket 212 mounted in a hole 214 in the cathode line 136. The terminal socket 212 is electrically insulated from the cathode line 136 by a wrapping 216 of insulation. A bowed washer 217 disposed in a counter bore **208*a* of hole 208 serves to remove any play in the mounting of the varactor 204 between anode line 70 and cathode line 136**.

Still in connection with FIGURE 7, an insulation coated bias lead 218 running in a longitudinal groove 220 formed in the lateral edge of cathode line 136 (FIGURE 4) is brought out through passageway 222 for electrical circuit connection to the bottom of terminal socket 212.

As most clearly seen in FIGURE 4, the bias cable 32 is fitted with a sleeve 224 which is inserted in a hole 226 provided in cathode line support 138 and retained in place by any convenient means such as dip brazing. The terminal end of bias cable 32, retained within sleeve 224 by a flange 228 which seats against an internal shoulder 230, is connected to terminal **232*a* which is in turn electrically connected to one plate of a coaxial capacitor indicated generally at 232. Capacitor terminal 232*b* electrically connected to the other plate of capacitor 232 is in electrical contact with the housing 12 via flange 228, sleeve 224 and support 138. The bias lead 218 retained in the groove 220 in the cathode line 136 makes circuit connection between the inner terminal 232*a* of coaxial capacitor 232 and the terminal socket 212 electrically contacting the lower terminal 210 of varactor 204. The coaxial capacitor 232 isolates this D.C. bias circuit from the housing 12 and from the high frequency energy in cathode cavity 48 by providing a shunt path at radio frequencies to the housing 12**.

Turning to a consideration of the operation of source 10, with a B+ voltage of +120 volts, for example, applied to the anode terminal 52 and a filament voltage of 6.3 volts applied to the filament pin 58, energization of the triode 50 is achieved. The resulting electron beam in the triode 50, a General Electric 7486/TK 9127 or its equivalent, delivers energy to the plate cavity 46 to excite oscillations of electromagnetic energy therein. The frequency of oscillation is determined, in part, by the parameters of the plate cavity 46, which functions electrically as the well-known tank circuit. A portion of the electromagnetic energy in plate cavity 46 is capacitively coupled to an output load via output connector 20. To sustain oscillatory operation of the source 10, a feedback path, consisting of the feedback screw 196 and the varactor 204 connected electrically in parallel as seen in FIGURE 8, capacitively couples a portion of the energy in plate cavity 46 to the cathode cavity 48 for application across the grid terminal 62 and the cathode terminal 54 of triode 50. The electron beam of the triode 50 is appropriately controlled by the amplitude and phase of the feedback energy in cathode cavity 48 to reinforce the electromagnetic energy oscillating in plate cavity 46.

As disclosed in my co-pending application, noted above, the frequency of operation of a triode oscillator may be varied by varying the parameters of the plate resonant cavity. In addition, the frequency may be readily varied, e.g., the source 10 tuned, by varying the phase of the feedback energy applied to the grid and cathode terminals of the triode. In the present invention, I readily achieve variations in the phase of the feedback energy by the inclusion in the feedback path between the plate cavity 46 and the cathode cavity 48 of the varactor 204 (FIGURE 8). Through appropriate D.C. biasing of a varactor, it functions electrically as a capacitor and, by variations in the D.C. bias, its capacitance also varies. In the disclosed embodiment the terminl 206, connected to the cathode of varactor 204, is electrically grounded by virtue of its direct electrical connection to the plate line 70. On the other hand, the terminal 210, connected to the plate of varactor 204, is insulated from the cathode line 136 by insulation 216 for D.C. and yet, is capacitively coupled to the plate line 136 at radio frequencies. The terminal 210 thus receives the D.C. biasing voltage over lead 218. Since, to function as a capacitor, the varactor 204 must be back-biased, the biasing voltage in the disclosed embodiment is maintained at negative values. It will be appreciated that the varactor 204 may be physically inverted such that the terminal 210 is connected to the cathode whereupon positive biasing voltages must be used.

It will be appreciated that as the capacitance of the varactor 204 varies, the feedback capacitive coupling between the plate cavity 46 and the cathode cavity 48 varies accordingly. Variations in the feedback coupling cause variations in the feedback energy amplitude but, most significant to the invention, also cause variations in the phase of the feedback energy. Variations in the phase of the feedback energy then cause variations in the operating frequency of the source 10.

With a varactor diode 204 rated at six volts, such as a Micro State MS3012 or its equivalent, the biasing voltage may range from −1 volts to −5 volts. As the biasing voltage increases negatively the capacitance of varactor decreases non-linearly and the operating frequency of source 10 increases. Thus the varactor 204, as electronically controlled by the biasing voltage, functions to frequency modulate the source 10.

The variations in operating frequency are explained by the fact that, at equilibrium conditions, the sum of the transadmittance of the triode 50 and the transfer-admittance of the plate cavity 46, cathode cavity 48 and the feedback path including feedback screw 196 and varactor 204 is equal to zero. The transfer-admittance determines the phase of the feedback energy and is itself determined by the parameter of the plate cavity 46, the cathode cavity 48 and the feedback path. One of the parameters of the feedback path is the capacitance of the varactor 204. With variations in the capacitance of the varactor 204, the transfer-admittance also varies and the operating frequency shifts to produce the equilibrium conditions where the transadmittance of triode 50 plus the transfer-admittance again equals zero.

The frequency tuning range or frequency modulation achieved of course depends on the type of varactor 204 employed since the greater the capacitive variation the greater the frequency tuning range. With a varactor of the type previously noted, frequency modulation of ±5 megacycles was achieved. However, with a varactor rated at 45 volts, as much as ±40 megacycles frequency modulation about a center operating frequency was achieved. The shorting blocks 106 and 174 are adjustably positioned to establish the center operating frequency while manipulation of the tuning screw 112 to vary its penetration into the plate cavity 46 serves to mechanically vary the center operating frequency over a range of as much as 20 megacycles.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A variable frequency microwave source comprising, in combination, (A) a vacuum tube triode
(B) a first resonant cavity coupled to the output of said triode
(C) a second resonant cavity coupled to the input of said triode
(D) a partition common to said first and second resonant cavity, said partition having
  (1) an aperture formed therein
(E) feedback means coupling feedback electromagnetic energy from said first resonant cavity to said second resonant cavity through said aperture, said feedback means including (1) a feedback screw adjustably positioned in said aperture in communication with said first and second resonant cavities and
  (2) a variable reactance element fixedly mounted in said aperture in communication with said first and second resonant cavities and
  (3) D.C. circuit means introduced into one of said resonant cavities for selectively varying the reactance of said element.

2. The device claimed in claim 1 wherein said variable reactance element is a varactor.

3. A frequency modulated microwave source comprising, in combination, (A) an electrically conductive housing, said housing including a
  (1) a partition positioned to define
  (2) first and second substantially equal resonant cavities
(B) a vacuum tube triode mounted in said partition, said triode having
  (1) an anode terminal disposed in said first resonant cavity,
  (2) a cathode terminal disposed in said second resonant cavity and
  (3) a grid terminal electrically coupled to said housing at radio frequencies
(C) an electrically conductive anode line member disposed in said first resonant cavity and electrically coupled to said anode terminal at radio frequencies
(D) an electrically conductive cathode line member disposed in said second resonant cavity and electrically connected to said cathode terminal and
(E) feedback circuit means for coupling feedback electromagnetic energy from said first resonant cavity to said second resonant cavity, through said partition, said feedback circuit means including
  (1) an electronically variable reactance element having
    (a) a first terminal electricially connected to one of said line members and
    (b) a second terminal electrically coupled to the other of said line members and
    (c) D.C. biasing circuit means introduced through said housing and electrically connected to said second terminal for electronically varying said reactance element to thereby frequency modulate said source about a center operating frequency.

4. The device claimed in claim 3 wherein said variable reactance element is a varactor.

5. The device claimed in claim 4 wherein said feedback circuit means further includes (2) a feedback screw supported by said cathode line member and extending through said partition, said feedback screw having
  (a) an adjustably positioned terminal end disposed in said first resonant cavity.

6. The device claimed in claim 5 which further includes (F) means adjustably positioned in said first and second resonant cavities for establishing a center operating frequency for said source and
(G) a tuning screw adjustably penetrating said first resonant cavity for mechanically varying said center operating frequency.

7. A variable frequency microwave source comprising, in combination, (A) a vacuum tube triode
(B) a first resonant cavity coupled to the output of said triode
(C) a second resonant cavity coupled to the input of said triode
(D) a feedback path coupling feedback electromagnetic energy from said first resonant cavity to said second resonant cavity, said feedback path including (1) an electronically variable means operable to vary the phase of said feedback electromagnetic energy, (2) thereby varying the operating frequency of said source (E) separate means disposed in said first and second resonant cavities, said means (1) being adjustably positioned to establish a center operating frequency for said source, and (F) means penetrating said first resonant cavity, said penetrating means (1) being adjustable to vary said center operating frequency established by said separate means disposed in said first and second resonant cavity.

References Cited by the Examiner

UNITED STATES PATENTS

| | | | |
|---|---|---|---|
| 2,790,928 | 4/1957 | Reed | 333—83 X |
| 2,984,794 | 5/1961 | Carter et al. | 332—30 X |
| 3,039,064 | 6/1962 | Dain et al. | 332—30 X |
| 3,162,823 | 12/1964 | Beaty | 331—101 |

OTHER REFERENCES

RCA TN No. 225, January 1959, Lynn (1 sht. "AFC Circuit for UHF Oscillator").

ROY LAKE, *Primary Examiner.*

A. L. BRODY, *Assistant Examiner.*